Figures 1, 2:
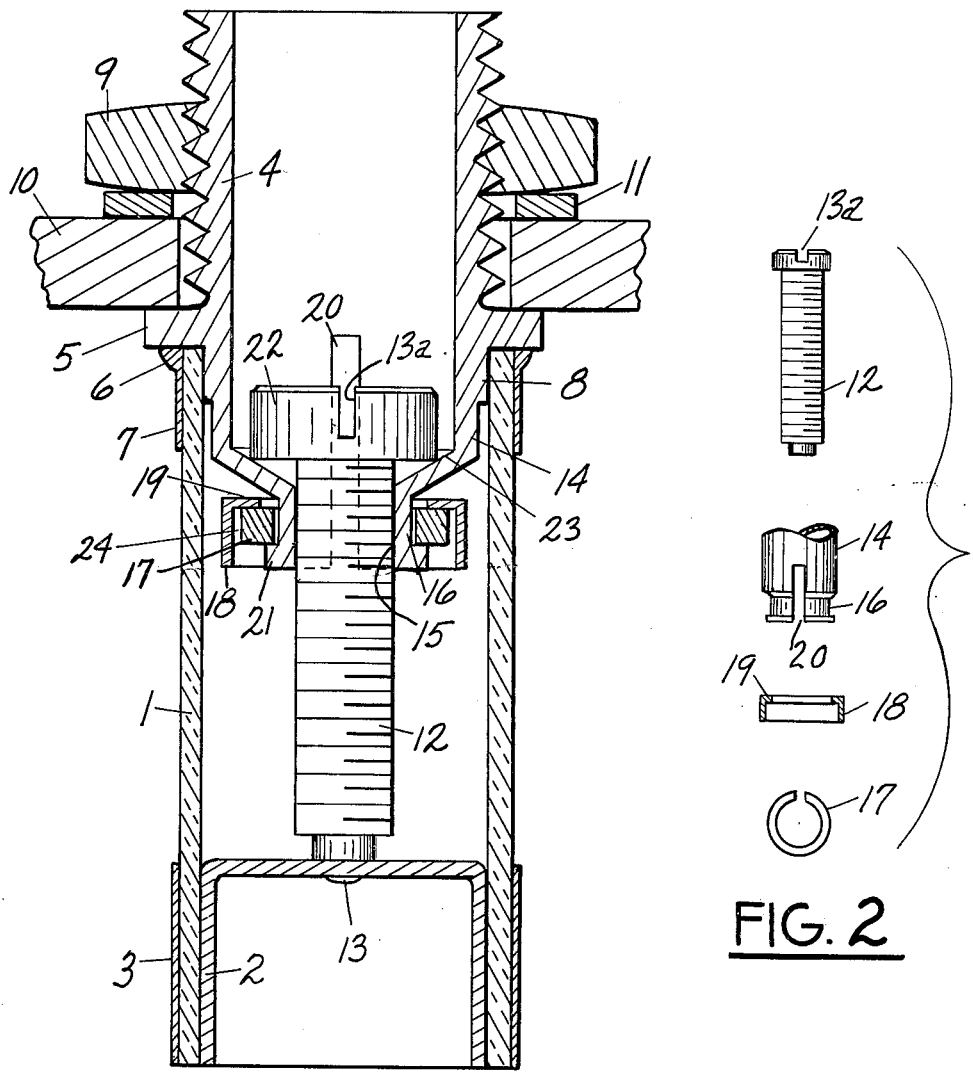

Feb. 22, 1966    G. A. ARNOLD    3,237,069
TRIMMER CONDENSER
Filed March 9, 1964

INVENTOR.
Gerald A. Arnold
BY
Ralph Hammar
Attorney

United States Patent Office 3,237,069
Patented Feb. 22, 1966

3,237,069
TRIMMER CONDENSER
Gerald A. Arnold, Erie, Pa., assignor to Erie Technological Products, Inc., Erie, Pa., a corporation of Pennsylvania
Filed Mar. 9, 1964, Ser. No. 350,307
4 Claims. (Cl. 317—249)

This invention is intended to improve the stability of trimmer condensers by providing uniform friction on the adjusting screw even after extreme overloads.

In the drawing, FIG. 1 is a longitudinal section through the condenser, and FIG. 2 is an exploded view of the adjusting screw and associated parts prior to assembly.

The trimmer condenser has a tubular dielectric 1 and a metal plunger 2 longitudinally slidable in the bore of the dielectric. The adjusted capacity of the trimmer is determined by the amount of overlap of the plunger 2 and an external electrode 3 at one end of the dielectric. The other end of the dielectric is mounted on a metal bushing 4 having a flange 5 butting against the other end of the dielectric and secured thereto by a solder bead 6 connecting the flange and an external metal coating 7 on the dielectric. The bushing has a shoulder 8 which fits in the bore of the dielectric and centers the dielectric. The bushing is externally threaded to receive a nut 9 by which the chassis 10 is clamped between the nut and flange 5 to mount the trimmer. A lock washer 11 prevents loosening of the nut.

The longitudinal position of the plunger 2 is adjusted by a screw 12 secured to one end of the plunger, for example by a weld 13, and having a screw driver slot 13a at the opposite end.

The bushing has an integral tubular section 14 having internal threads 15 cooperating with the screw. At the extreme end of the tubular section 14 is a groove 16 receiving a spring such as a split spring ring 17 which normally squeezes the threads 15 inward to slightly less than the external diameter of the threads of the screw 12. Surrounding the split ring 17 is a rigid collar 18 having an inwardly extending flange 19 behind the split ring 17. The tubular section 14 has a slot 20 which provides enough clearance so that when the outer ends are passed together, the collar 18 and then the split ring 17 can be slipped over the shoulder 21 at the outer end of the groove 16. After the collar and split ring have been assembled in that order, the outer ends of the tubular section are released and spring apart. The screw 12 is then threaded into the threads 15 and the outer end is welded at 13 to the plunger 2. After the weld 13 has been made, the assembly cannot be taken apart.

The screw moves between the limits of travel permitted by bottoming of the head 22 of the screw against the chamfered surface 23 on the tubular section 14 or by the bottoming of the plunger 2 against the outer end of the tubular section 14. At either limit of travel, continued turning force applied to the head 22 of the screw results in camming the outer end of the tubular section 14 apart to the extent permitted by the clearance 24 between the split ring 17 and the collar 18. As soon as the split ring 17 expands against the collar 18, further expansion is prevented and overstressing of the split ring and of the resilient sections of the tube 14 is prevented. Even if the user should exert much greater than normal manual turning forces on the screw 12, overstressing is prevented and when the screw is returned to the normal operating range, the tension applied by the split ring 17 maintains the desired uniform frictional engagement between the threads 15 and the screw 12 desired to hold the trimmer in its adjusted position. The shoulder 21 at the outer end of the groove 16 holds the ring 17 in the groove because it has a greater outside diameter than the maximum inside diameter of the ring 17 when expanded against the collar 18. The flange 19 behind the ring provides a shoulder of smaller inside diameter than the outside diameter of the ring and holds the collar in position on the ring.

Without the collar 18, it would be possible to overstress the split ring 17 at either the maximum or minimum capacitance position so that upon adjustment to an intermediate position, the thread tension would be altered.

What is claimed as new is:

1. In a trimmer condenser of the type having a tubular dielectric with an external electrode over part of its length, a metal plunger movable along the bore of the dielectric, mounting means for the dielectric, and an externally threaded adjusting screw within the bore of the tubular dielectric connected to the plunger for positioning the plunger relative to said electrode to adjust the capacity, the improvement which comprises a tubular section fixed to said mounting means and having a slotted end providing a resilient section with internal threads engaging the external threads of the screw, said slotted end having an external groove receiving a split spring ring normally compressing the resilient section and holding the internal threads against the external threads with a friction grip, means on the screw engaging said slotted end to stop the travel of the screw, a collar surrounding the ring and having a clearance between it and the ring limiting the expansion of the ring to prevent stressing the ring beyond its elastic limit by torque applied to the screw to move it beyond the stop means, said groove having at the outer part of said slotted end a shoulder of greater outside diameter than the inside diameter of said ring when expanded against said collar for holding the ring in the groove, and said collar having a shoulder behind the ring of smaller inside diameter than the outside diameter of the ring for holding the collar in position on the ring.

2. In a trimmer condenser of the type having a stationary electrode, a metal plunger and an externally threaded adjusting screw for positioning the plunger relative to said electrode to adjust the capacity, the improvement which comprises a tubular section having a slotted end providing a resilient section with internal threads engaging the external threads of the screw, said screw projecting through said slotted end and fixed to said plunger, said slotted end having an external groove receiving a split spring ring normally compressing the resilient section and holding the internal threads against the external threads with a friction grip, a collar surrounding the ring and having a clearance between it and the ring limiting the expansion of the ring, said groove having at the outer part of said slotted end a shoulder of greater outside diameter than the inside diameter of said ring when expanded against said collar for holding the ring in the groove.

3. In a device having an externally threaded adjusting screw, a tubular section having a slotted end providing a resilient section with internal threads engaging the external threads of the screw, said slotted end having an external groove receiving a split spring ring normally compressing the resilient section and holding the internal threads against the external threads with a friction grip, means on the screw engaging said slotted end to stop the travel of the screw, a collar surrounding the ring and having a clearance between it and the ring limiting the expansion of the ring to prevent stressing the ring beyond its elastic limit by torque applied to the screw to move it beyond the stop means, said groove having at the outer part of said slotted end a shoulder of greater outside diameter than the inside diameter of said ring when expanded against said collar for holding the ring in the groove.

4. In a device having an externally threaded adjusting screw, a tubular section having a slotted end providing a resilient section with internal threads engaging the external threads of the screw, said slotted end having an external groove receiving a split spring ring normally compressing the resilient section and holding the internal threads against the external threads with a friction grip, a collar surrounding the ring and having a clearance between it and the ring limiting the expansion of the ring, said groove having at the outer part of said slotted end a shoulder of greater outside diameter than the inside diameter of said ring when expanded against said collar for holding the ring in the groove, and said collar having a flange behind the ring of smaller inside diameter than the outside diameter of the ring for holding the collar in position on the ring.

References Cited by the Examiner

UNITED STATES PATENTS 2,765,431  10/1956  Repko _____ 317—249

FOREIGN PATENTS 920,773  3/1963  Great Britain.
418,843  3/1947  Italy.
245,800  7/1947  Switzerland.

OTHER REFERENCES

Tronser: German application No. 1,127,472 published April 12, 1962.

JOHN F. BURNS, *Primary Examiner.*